US012592608B2

(12) United States Patent　　　　(10) Patent No.: US 12,592,608 B2
Natsume et al.　　　　　　　　　　　(45) Date of Patent: Mar. 31, 2026

(54) MOTOR UNIT AND VEHICLE STEERING DEVICE

(71) Applicant: JTEKT CORPORATION, Kariya (JP)

(72) Inventors: Yusuke Natsume, Okazaki (JP); Nobuyasu Saji, Okazaki (JP); Kosuke Tsukahara, Okazaki (JP); Kenichi Fukunaga, Okazaki (JP); Takaya Tanikawa, Toyohashi (JP)

(73) Assignee: JTEKT CORPORATION, Kariya (JP)

( * ) Notice: Subject to any disclaimer, the term of this patent is extended or adjusted under 35 U.S.C. 154(b) by 237 days.

(21) Appl. No.: 18/700,176

(22) PCT Filed: Nov. 10, 2021

(86) PCT No.: PCT/JP2021/041417
§ 371 (c)(1),
(2) Date: Apr. 10, 2024

(87) PCT Pub. No.: WO2023/084654
PCT Pub. Date: May 19, 2023

(65) Prior Publication Data
US 2024/0275233 A1　　Aug. 15, 2024

(51) Int. Cl.
*H02K 5/22*　　　(2006.01)
*B62D 5/04*　　　(2006.01)
(Continued)

(52) U.S. Cl.
CPC ............. *H02K 5/22* (2013.01); *B62D 5/0409* (2013.01); *H02K 7/1166* (2013.01); *H02K 21/16* (2013.01)

(58) Field of Classification Search
CPC ........ H02K 5/22; H02K 7/1166; H02K 21/16; B62D 5/0409
See application file for complete search history.

(56) References Cited

U.S. PATENT DOCUMENTS

2019/0047611 A1* 2/2019 Murakami ............. H02K 11/33

FOREIGN PATENT DOCUMENTS

| JP | 2009-213197 A | 9/2009 |
| JP | 2012-090495 A | 5/2012 |
| JP | 2012-090496 A | 5/2012 |

OTHER PUBLICATIONS

Jan. 11, 2022 International Search Report issued in International Patent Application No. PCT/JP2021/041417.
(Continued)

*Primary Examiner* — Viet P Nguyen
(74) *Attorney, Agent, or Firm* — Oliff PLC

(57) ABSTRACT
A motor attaching structure, a motor unit, and a vehicle steering device, capable of suppressing vibrations generated by a motor from being conveyed to an attachment-receiving object, while maintaining support rigidity regarding the motor by attaching a motor case to an attachment-receiving object by a fastening member. A motor case of a motor, in which a stator and a rotor are housed in the motor case, is attached by bolts to a housing serving as an attachment-receiving object. The motor case has a cylindrical portion that houses the stator, and a bottom portion that is provided so as to protrude toward an inner side in a radial direction from one end portion of the cylindrical portion. A fastening portion for receiving the bolt is provided on the bottom portion on an inner side of an outer peripheral face of the cylindrical portion.

8 Claims, 11 Drawing Sheets

(51) Int. Cl.
H02K 7/116 (2006.01)
H02K 21/16 (2006.01)

(56) References Cited

OTHER PUBLICATIONS

Jul. 14, 2025 Search Report issued in European Patent Application No. 21963483.9.

* cited by examiner

MOTOR UNIT AND VEHICLE STEERING DEVICE

TECHNICAL FIELD

The present invention relates to a motor attaching structure, a motor unit, and a vehicle steering device.

BACKGROUND ART

An electric power steering system for vehicles is previously known which generates steering assisting force using a motor. The present applicant has proposed an electric power steering system described in PTL 1 that includes a structure for suppressing vibrations generated by a motor from being conveyed to a housing serving as an attachment-receiving object.

The motor of the electric power steering system described in PTL 1 has a rotor and a stator, an output shaft that rotates together with the rotor, and a motor case that houses the rotor and the stator. The motor case is attached to a housing that houses a worm reducer mechanism, and the output shaft of the motor is linked to a worm that is an input gear of the worm reducer mechanism. Torque of the motor that is amplified by the worm reducer mechanism is applied to a steering shaft as steering assisting force.

The motor case is made up of a case main body formed in a cylindrical shape with a bottom, and a plate fixed to the case main body. The case main body integrally has a cylindrical tubular portion to which the stator is fixed on an inner peripheral face thereof, and an annular bottom portion extending toward an inner side in a radial direction from one end portion of the tubular portion. A housing portion is provided at the bottom portion to house a bearing that supports the output shaft. The plate integrally has a base portion facing the bottom portion of the case main body, and a pair of attaching portions extending toward an outer side in the radial direction from an outer peripheral edge of the base portion. The base portion is provided with a fitting part that is press-fitted to an outer periphery of the housing portion provided at the bottom portion of the case main body, and the plate is fixed to the case main body by the press-fitting of this fitting portion. A through hole is formed in each of the attaching portions of the plate, and a fastening bolt is screwed into a bolt hole formed in the housing through the through hole. Minute clearances are formed between an outer peripheral side portion of the fitting portion of the base portion and the bottom portion of the case main body, and between the base portion and the housing.

CITATION LIST

Patent Literature

PLT 1: JP 2012-090496 A

SUMMARY OF INVENTION

Technical Problem

According to the electric power steering system described in PTL 1, vibrations generated in the stator are diminished by the plate of the motor case, and vibrations conveyed to the housing are suppressed. However, due to this structure, supporting rigidity of the case main body and the stator relative to the housing becomes low, and the output shaft becomes inclined more readily due to G-forces (acceleration) in front-rear, right-left, and up-down directions when the vehicle is traveling, for example.

Accordingly, it is an object of the present invention provide a motor attaching structure, a motor unit, and a vehicle steering device, which enable vibrations generated by a motor to be suppressed from being conveyed to an attachment-receiving object, while maintaining support rigidity regarding the motor by attaching a motor case to the attachment-receiving object by a fastening member.

Solution to Problem

In order to achieve the above object, the present invention provides a motor attaching structure for attaching a motor case of a motor, in which a stator and a rotor are housed in the motor case, to an attachment-receiving object, by a fastening member, in which the motor case has a cylindrical portion that houses the stator, and a bottom portion that is provided so as to protrude toward an inner side in a radial direction from one end portion of the cylindrical portion, a fastening portion for receiving the fastening member is provided at the bottom portion, and the fastening portion is provided on an inner side of an outer peripheral face of the cylindrical portion.

Also, in order to achieve the above object, the present invention provides a motor unit, including a motor that has a stator, a rotor disposed on an inner side of the stator, an output rotation shaft that rotates integrally with the rotor, and a motor case that houses the stator, a worm reducer mechanism that has a worm linked to the output rotation shaft, and a worm wheel that meshes with the worm, a housing that houses the worm and the worm wheel, and a fastening member that fastens the motor case and the housing, in which the motor case has a cylindrical portion that houses the stator, and a bottom portion that is provided so as to protrude toward an inner side in a radial direction from one end portion of the cylindrical portion, a fastening portion for receiving the fastening member is provided at the bottom portion, and the fastening portion is provided on an inner side of an outer peripheral face of the cylindrical portion.

Also, in order to achieve the above object, the present invention provides a vehicle steering device that steers steered wheels of a vehicle by moving, in an axial direction, a steered shaft that extends in a vehicle width direction of the vehicle, in which the above-described motor unit is used as a drive source to generate a moving force that moves the steered shaft in the axial direction.

Advantageous Effects of Invention

According to the motor attaching structure, the motor unit, and the vehicle steering device, according to the present invention, vibrations generated by the motor can be suppressed from being conveyed to the attachment-receiving object, while maintaining support rigidity regarding the motor by attaching the motor case to the attachment-receiving object by the fastening member.

BRIEF DESCRIPTION OF DRAWINGS

FIG. 9A is an explanatory diagram illustrating expansion/contraction vibrations of the motor in an exaggerated manner.

FIG. 9B is an explanatory diagram illustrating expansion/contraction vibrations of the motor in an exaggerated manner.

FIG. 13 is an external view of a motor case according to a modification.

DESCRIPTION OF EMBODIMENTS (Embodiment)

An embodiment of the present invention will be described with reference to the drawings. Note that the embodiment described below is shown as a preferred specific example for carrying out the present invention, and while some portions specifically exemplify various technical matters that are technically preferable, the technical scope of the present invention is not limited to this specific embodiment.

(Configuration of Electric Power Steering System)

Figure 1:
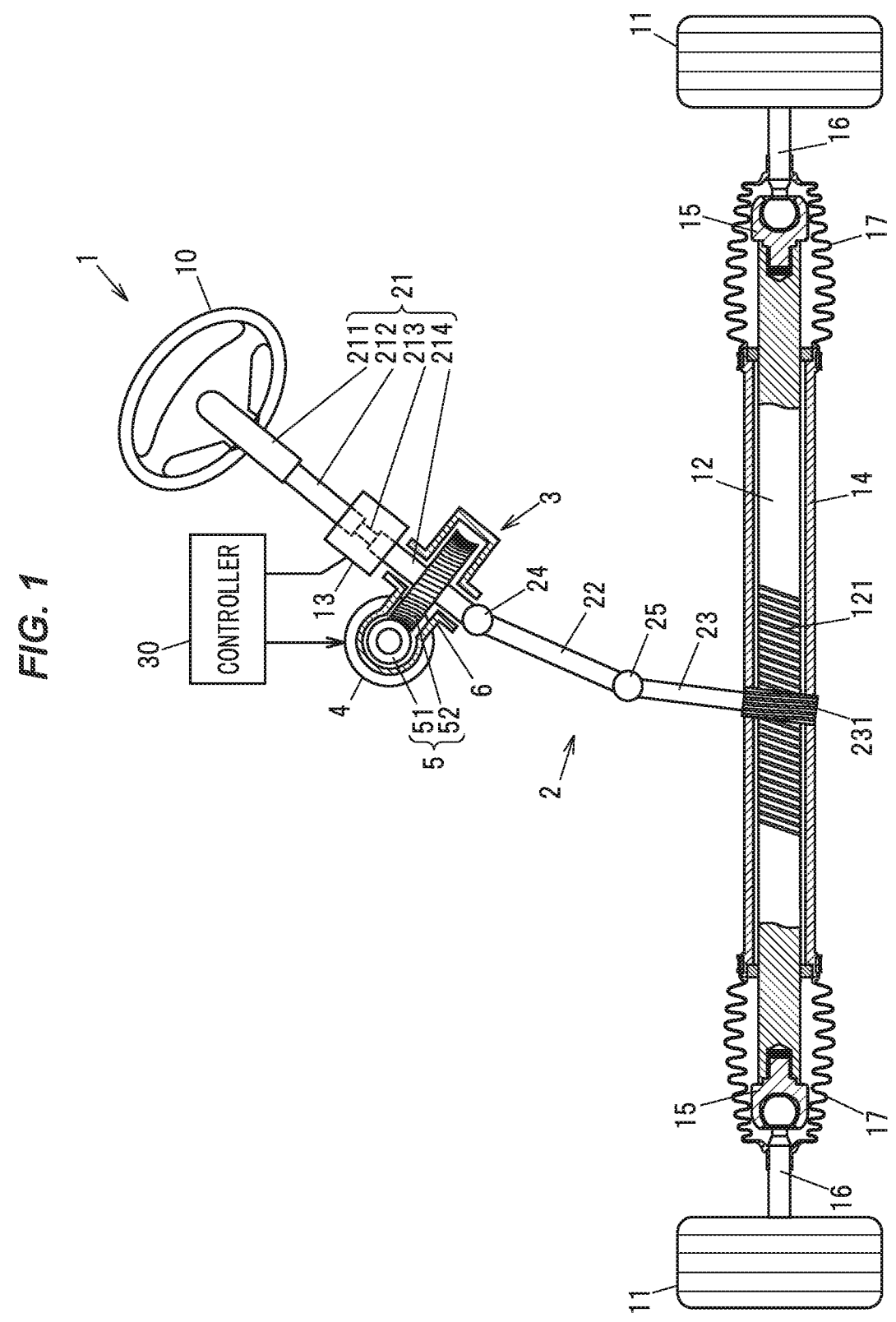
FIG. 1 is a schematic diagram illustrating a configuration example of a steering device according to an embodiment of the present invention.

FIG. 1 is a schematic diagram illustrating a configuration example of a steering device for a vehicle according to the embodiment of the present invention. FIG. 1 illustrates the steering device in a state as viewed from forward of the vehicle, with a left side in FIG. 1 corresponding to a right side of the vehicle, and a right side in FIG. 1 to a left side of the vehicle, respectively.

The steering device 1 includes a steering shaft 2 linked to a steering wheel 10 with which a driver performs steering operations, a rack shaft 12 serving as a steered shaft for steering front wheels 11 on the right and left, which are steered wheels of the vehicle, by movement in an axial direction in accordance with turning of the steering shaft 2, a torque sensor 13 that detects steering torque applied to the steering wheel 10, a motor unit 3 that generates a steering assisting force in accordance with the steering torque that is detected, and a controller 30 that controls the motor unit 3.

The steering shaft 2 is made up having a column shaft 21 to which the steering wheel 10 is fixed at a distal end portion thereof, a pinion shaft 23 having pinion teeth 231 that mesh with rack teeth 121 of the rack shaft 12, an intermediate shaft 22 that is interposed between the column shaft 21 and the pinion shaft 23, a universal joint 24 that links the column shaft 21 and the intermediate shaft 22, and a universal joint 25 that links the intermediate shaft 22 and the pinion shaft 23.

The column shaft 21 includes an upper shaft 211 and a lower shaft 212 that are spline-fitted in a telescopically adjustable manner, a torsion bar 213 that is connected to a rear end portion of the lower shaft 212, and an output shaft 214 that is connected to a rear end portion of the torsion bar

213. The torsion bar 213 has sufficient ductility to transmit the steering torque to the output shaft 214 while being twisted by the steering torque applied to the steering wheel 10. The torque sensor 13 detects the steering torque based on an amount of twisting of the torsion bar 213.

The rack shaft 12 is housed in a rack housing 14 that is tubular, and extends in a vehicle width direction. Ball joint sockets 15 are fixed to both end portions of the rack shaft 12, respectively, and tie rods 16 linked to the rack shaft 12 by these ball joint sockets 15 steer the right and left front wheels 11 via knuckle arms that are omitted from illustration. Accordion-like bellows 17 made of rubber or resin are disposed on outer peripheral sides of the ball joint sockets 15.

When steering operation of the steering wheel 10 is performed, the pinion shaft 23 linked to the steering wheel 10 via the column shaft 21 and the intermediate shaft 22 turns, and the rack shaft 12 moves in the axial direction by meshing of the pinion teeth 231 and the rack teeth 121. This axial direction movement of the rack shaft 12 causes the right and left front wheels 11 to be steered via the tie rods 16.

The motor unit 3 includes a motor 4 that receives supply of a driving current from the controller 30 and generates torque, a worm reducer mechanism 5 that has a worm 51 and a worm wheel 52, a housing 6 that houses the worm 51 and the worm wheel 52, and a fastening member (described later) for attaching the motor 4 to the housing 6. The worm 51 is rotated by the torque of the motor 4. The worm wheel 52 meshes with the worm 51 and rotates at a lower rotational speed than the worm 51.

The output shaft 214 is fixed to the worm wheel 52, and the torque of the motor 4 amplified by the worm reducer mechanism 5 is transmitted to the output shaft 214 as steering assisting force. This steering assisting force is transmitted to the pinion shaft 23 via the intermediate shaft 22, and becomes a moving force that moves the rack shaft 12 in the axial direction. That is to say, the steering device 1 uses the motor unit 3 as a drive source that generates moving force to move the rack shaft 12 in the axial direction.

Figure 2:
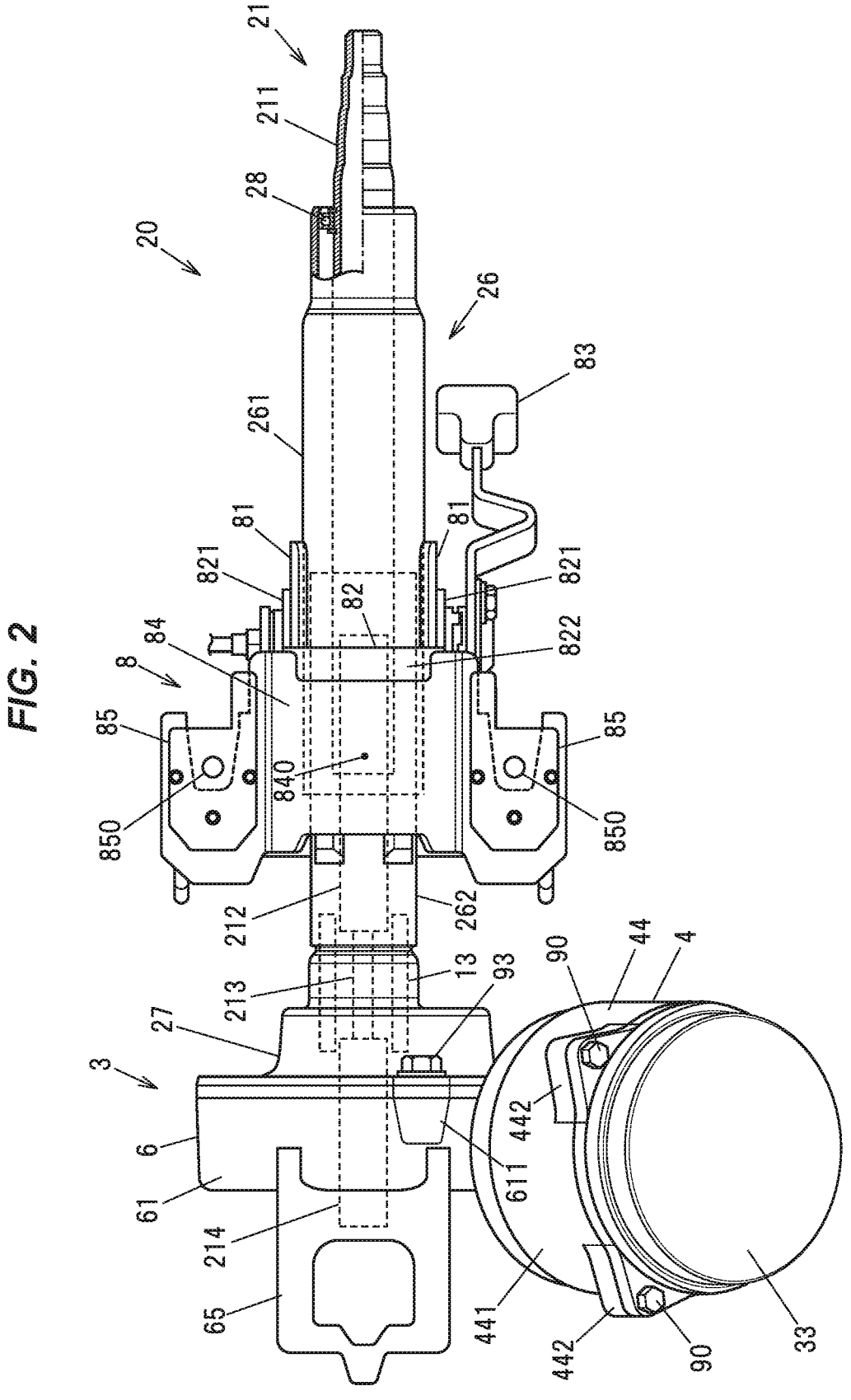
FIG. 2 is a schematic configuration diagram illustrating a column shaft, a column tube, a sensor case, a bracket, and a motor unit of the steering device.

FIG. 2 is a schematic configuration diagram illustrating a column tube 26 in which is housed the column shaft 21, the upper shaft 211, and the lower shaft 212, a sensor case 27 that houses the torque sensor 13, a bracket 8 that supports the column tube 26 with respect to a vehicle body, and the motor unit 3. The column shaft 21, the column tube 26, the sensor case 27, the bracket 8, and the motor unit 3 make up a steering column device 20. In the following description, "upward" and "downward" refer to the up-down direction in a vertical direction, in a state in which the steering device 1 is installed in the vehicle. FIG. 2 illustrates the steering column device 20 in a state as viewed obliquely from above, perpendicular to the column shaft 21.

The column tube 26 has an outer tube 261 and an inner tube 262, and a portion of the inner tube 262 on the steering wheel 10 side is housed inside the outer tube 261. A rear end portion of the inner tube 262 is fitted and fixed to the sensor case 27. The upper shaft 211 is rotatably supported with respect to the outer tube 261 by a bearing 28.

The bracket 8 has a pair of fixing plates 81 fixed to the outer tube 261, a clamping member 82 that has a pair of clamping plates 821 that clamp the fixing plates 81 in the vehicle width direction and a top plate 822 that is disposed upward from the outer tube 261, an operating lever 83 for releasing a clamped state of the fixing plates 81 by the clamping member 82, a plate 84 that is fixed to the top plate 822 of the clamping member 82 and extends in the vehicle width direction, and a pair of capsules 85 that is detachably attached to both end portions of the plate 84. The capsules 85 are fixed to a vehicle body side by bolts (omitted from illustration) that are inserted into bolt insertion holes 850.

When performing tilt adjustment and telescopic adjustment of the steering wheel 10, the driver of the vehicle operates the operating lever 83 to release the clamped state of the fixing plates 81 by the clamping member 82. Also, in a vehicle collision, in the event of a secondary collision occurring in which the driver strikes the steering wheel 10, the plate 84 separates from the capsules 85, and the fixing plates 81, the clamping member 82, and the outer tube 261 and the upper shaft 211 move toward a frontward side of the vehicle along with the steering wheel 10.

Figure 3:
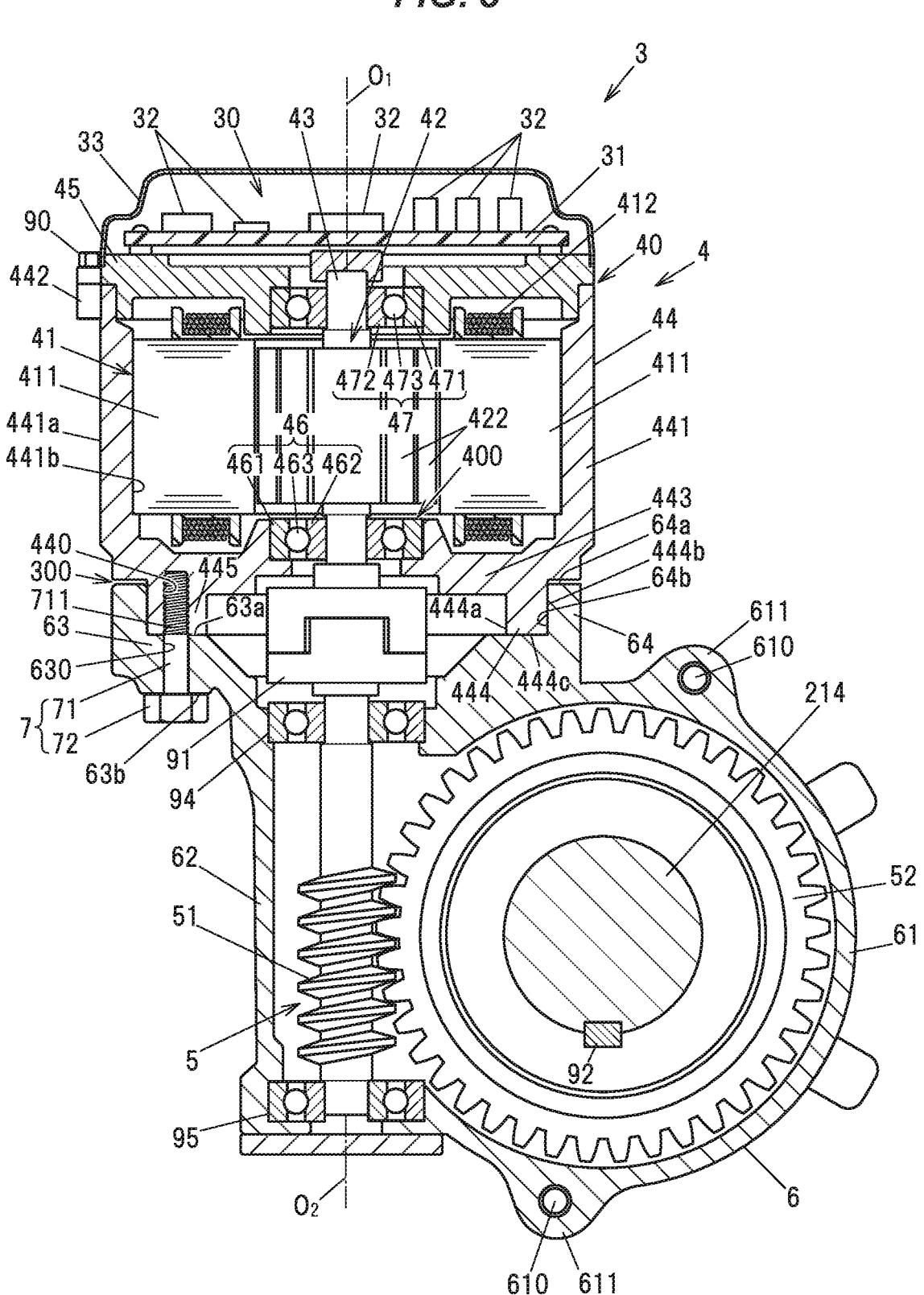
FIG. 3 is a sectional view of the motor unit.
Figure 4:
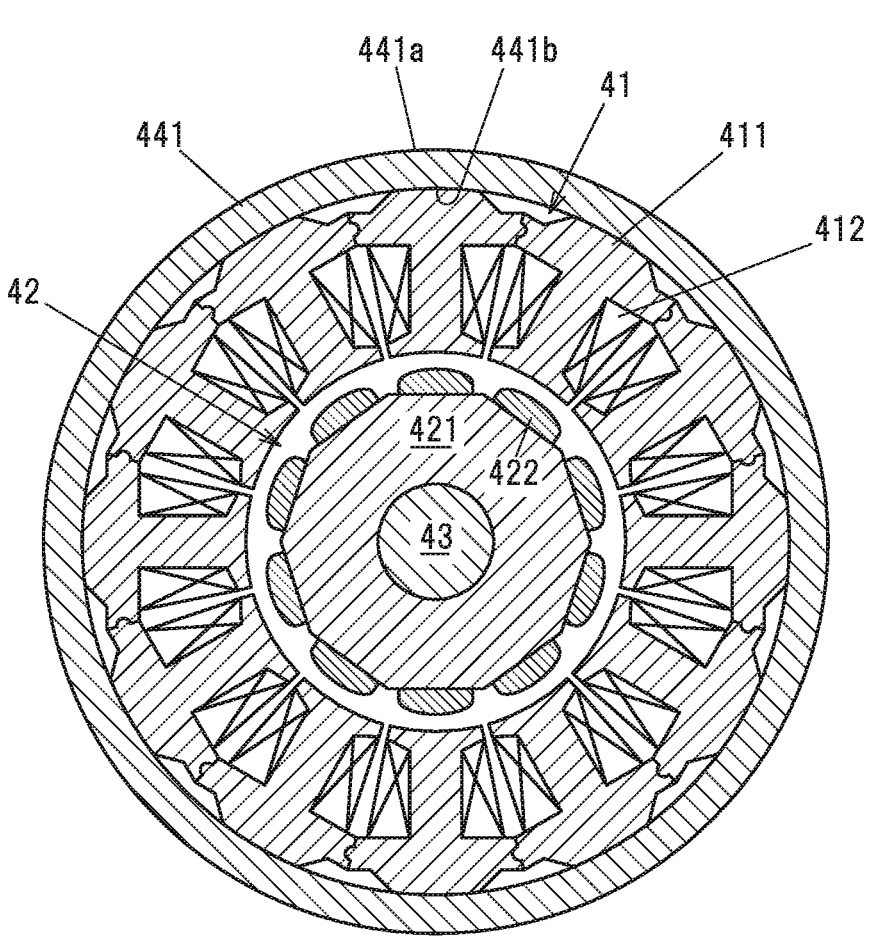
FIG. 4 is a sectional view of a motor.

FIG. 3 is a sectional view of the motor unit 3. FIG. 4 is a sectional view of the motor 4. The motor 4 has a stator 41 that generates a magnetic field by the driving current supplied from the controller 30, a rotor 42 that is disposed on an inner side of the stator 41, an output rotation shaft 43 that integrally rotates with the rotor 42, a motor case 44 formed in a cylindrical shape with a bottom that houses the stator 41, a lid member 45 that is disposed upward from the motor case 44 and that covers one end opening portion 40 of the motor case 44, and first and second bearings 46 and 47.

The stator 41 is configured with a plurality of teeth 411 disposed in an annular form, with windings 412 wound thereupon, as illustrated in FIG. 4. In the present embodiment, twelve teeth 411 are disposed in an annular form. The rotor 42 has a rotor core 421 and a plurality of magnets 422 fixed to the rotor core 421. In the present embodiment, ten magnets 422 are disposed on an outer periphery of the rotor core 421. The teeth 411 and the rotor core 421 are made by laminating a plurality of electromagnetic steel sheets.

The output rotation shaft 43 is inserted through a center portion of the rotor core 421, one end portion that protrudes downward from the rotor core 421 is supported by the first bearing 46, and an other end portion that protrudes upward from the rotor core 421 is supported by the second bearing 47. The first bearing 46 is disposed between the output rotation shaft 43 and the motor case 44, and the second bearing 47 is disposed between the output rotation shaft 43 and the lid member 45. The first and second bearings 46 and 47 have outer rings 461 and 471, inner rings 462 and 472, and a plurality of rolling elements 463 and 473 that are disposed between the outer rings 461 and 471 and the inner rings 462 and 472.

Figures 5, 6:
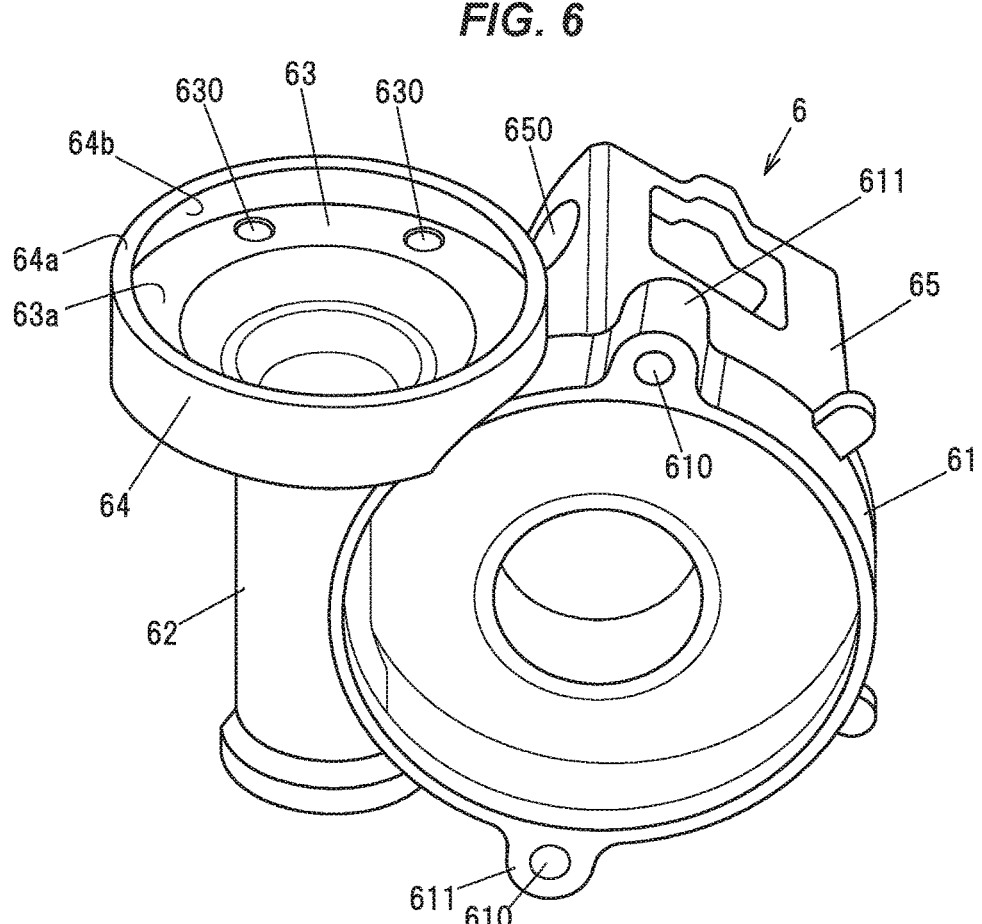
FIG. 5 is a perspective view illustrating a motor case.
FIG. 6 is a perspective view of a housing.
Figure 7:
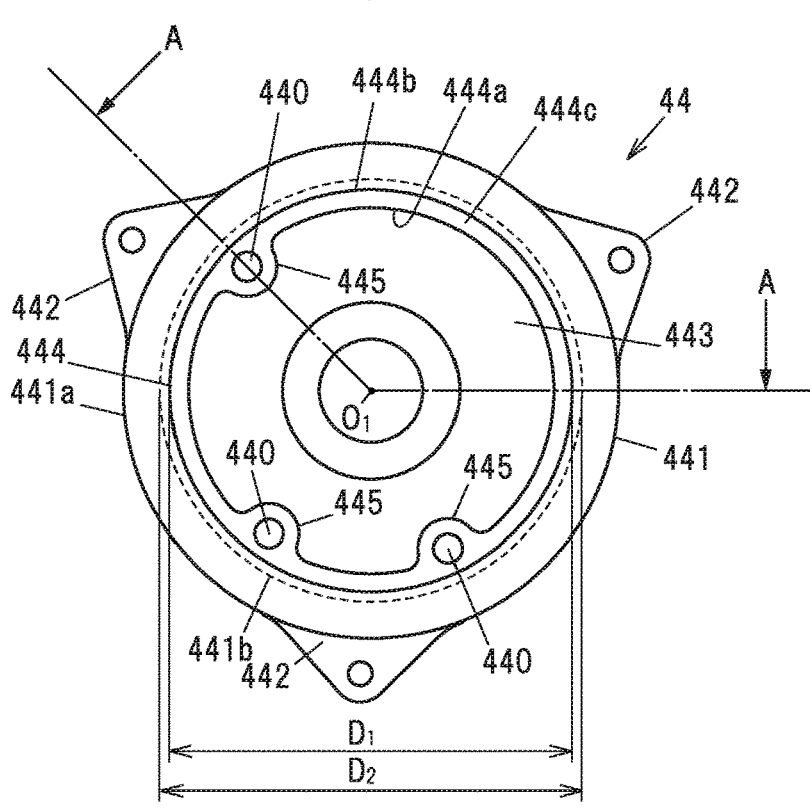
FIG. 7 is an external view of the motor case.
Figure 8:
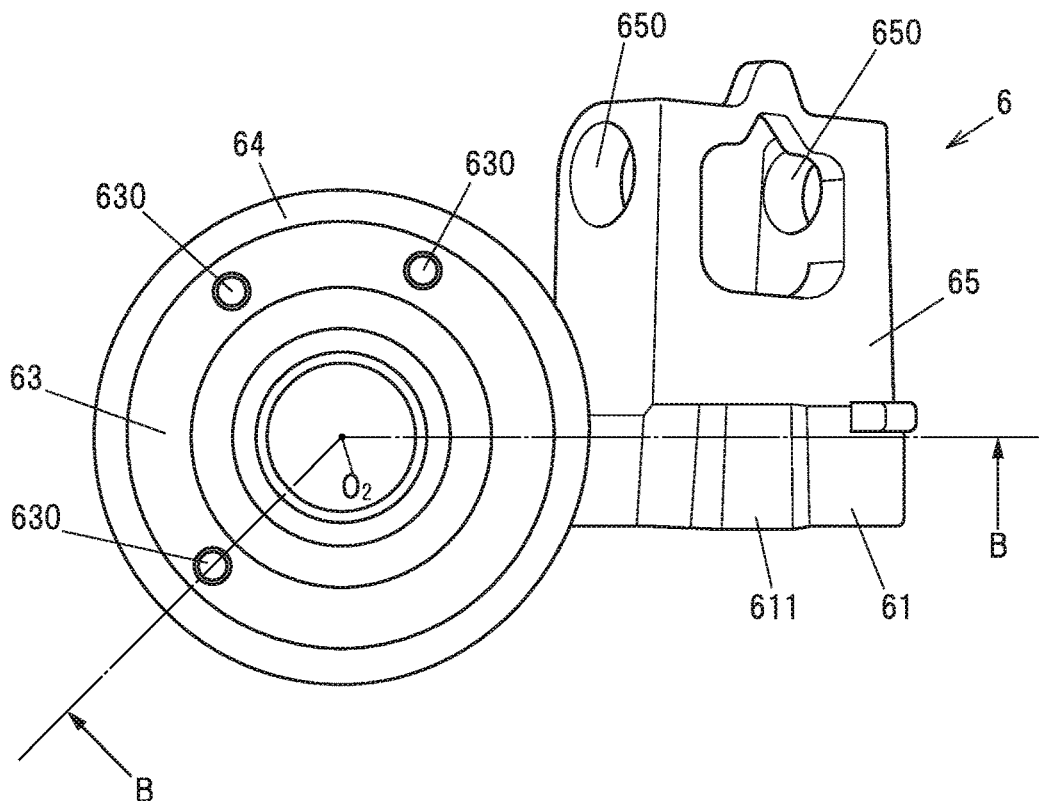
FIG. 8 is an external view of the housing.

FIG. 5 is a perspective view illustrating the motor case 44. FIG. 6 is a perspective view illustrating the housing 6. FIG. 7 is an external view of the motor case 44 as viewed from a direction of a rotation axis $O_1$ of the output rotation shaft 43. FIG. 8 is an external view of the housing 6 as viewed from a direction of a rotation axis $O_2$ of the worm 51. FIG. 3 illustrates a cross section of the motor case 44 taken along the line A-A indicated in FIG. 7, and a cross section of the housing 6 taken along the line B-B indicated in FIG. 8.

The motor case 44 is made of a die-cast aluminum alloy, and integrally has a cylindrical portion 441 that is cylindrical and that houses the stator 41, a plurality of flange portions 442 for fixing the lid member 45, and a bottom portion 443 provided so as to protrude toward an inner side in the radial direction from one end portion of the cylindrical portion 441. The lid member 45 is fixed to the motor case 44 by a plurality of bolts 90 that are screwed into the flange portions 442. The stator 41 is fixed on the inner side of the cylindrical portion 441. A holding hole 400 for holding the outer ring 461 of the first bearing 46 is formed in a center portion of the bottom portion 443 and passes through the bottom portion 443, and the output rotation shaft 43 is inserted through the inner ring 462 of the first bearing 46.

The bottom portion 443 is provided with an inner-side annular protruding portion 444 formed protruding downward toward the housing 6 side, and a plurality of fastening portions 445 in which screw holes 440 are formed. The inner-side annular protruding portion 444 is formed in an annular shape centered on the rotation axis $O_1$ of the output rotation shaft 43. The fastening portions 445 are provided further on an inner side of an outer peripheral face 441a of the cylindrical portion 441, which corresponds to an outer peripheral side of the stator 41, when viewing the motor case 44 from the bottom portion 443 side along the rotation axis $O_1$, as illustrated in FIG. 7. Also, the fastening portions 445 are formed protruding toward an inner side from an inner peripheral face 444a of the inner-side annular protruding portion 444, and are provided on an inner side of an outer peripheral face 444b of the inner-side annular protruding portion 444.

The diameter of the outer peripheral face 444b of the inner-side annular protruding portion 444 (outside diameter D1 of inner-side annular protruding portion 444) is formed to be smaller than the diameter of an inner peripheral face 441b of the cylindrical portion 441 to which the stator 41 is fixed (bore diameter D2 of cylindrical portion 441). A distal end face 444c of the inner-side annular protruding portion 444 is a plane perpendicular to the rotation axis $O_1$ of the output rotation shaft 43. The screw holes 440 extend parallel to the rotation axis $O_1$.

In the present embodiment, the controller 30 is disposed upward from the lid member 45, and is integrated with the motor 4. The controller 30 is made up of a board 31 fixed to the lid member 45, and a plurality of electronic components 32 mounted on the board 31. Examples of the electronic components 32 include switching elements such as power transistors and the like, a CPU (central processing unit), and so forth. Upward of the board 31 is covered with a cover 33 attached to the lid member 45. Note that the controller 30 may be disposed between the stator 41 and the bottom portion 443 of the motor case 44. Also, the controller 30 may be a separate entity from the motor 4.

The controller 30 supplies the windings 412 of the stator 41 with the driving current of which the magnitude corresponds to steering torque detected by the torque sensor 13, and vehicle speed. The driving current supplied by the controller 30 is a three-phase alternating current that generates a rotating magnetic field in the stator 41. The rotor 42 rotates following the rotating magnetic field, due to attractive forces and repulsive forces acting between the teeth 411 and the magnets 422.

The worm 51 is disposed coaxially arrayed with the output rotation shaft 43 of the motor 4, and is linked to the output rotation shaft 43 via a coupling 91. The output shaft 214 is inserted through a center portion of the worm wheel 52, and relative rotation between the worm wheel 52 and the output shaft 214 is regulated by a key 92.

The housing 6 integrally has a main body portion 61 that houses the worm wheel 52, a tubular portion 62 that houses the worm 51, an attaching portion 63 that faces the bottom portion 443 of the motor case 44, an outer-side annular protruding portion 64 that is provided in an annular form on an outer periphery of the attaching portion 63, and a supported portion 65 in which is formed a pair of tilt bolt insertion holes 650, into which tilt bolts (omitted from illustration), serving as a center of tilting during tilt adjustment, are inserted. The main body portion 61 of the housing 6 is provided with a plurality of flange portions 611 having screw holes 610 formed therein, into which bolts 93 (see FIG. 2) for fixing the sensor case 27 are screwed.

A pair of bearings 94 and 95 that rotatably support the worm 51 is housed in the tubular portion 62. The attaching portion 63 is formed in a disc-like shape and extends from one end portion of the tubular portion 62 that is upward in a direction perpendicular to the rotation axis $O_2$ of the worm 51. An upper face 63$a$ of the attaching portion 63 is a contact surface with which the distal end face 444$c$ of the inner-side annular protruding portion 444 of the motor case 44 comes into contact. The outer-side annular protruding portion 64 projects further upward than the upper face 63$a$ of the attaching portion 63. A protruding height of the outer-side annular protruding portion 64 from the upper face 63$a$ of the attaching portion 63 is set to a size such that a distal end face 64$a$ of the outer-side annular protruding portion 64 does not come into contact with the motor case 44. That is to say, the height of the outer-side annular protruding portion 64 from the attaching portion 63 is set to be smaller than a length of the inner-side annular protruding portion 444 in the axial direction. As a result, in a state in which the motor case 44 is attached to the housing 6, a clearance 300 of a predetermined value is created between the distal end face 64$a$ of the outer-side annular protruding portion 64 and the motor case 44, in the direction of the rotation axis $O_1$.

The motor 4 is attached to the housing 6 as an attachment-receiving object by an attachment structure, using bolts 7 as fastening members. Each bolt 7 has a threaded portion 71 in which an external thread 711 is formed, and a head 72 having a larger diameter than the threaded portion 71. The attaching portion 63 of the housing 6 has a plurality of bolt insertion holes 630, through which the threaded portions 71 of the bolts 7 are inserted, formed therein. The bolt insertion holes 630 pass through the attaching portion 63 in parallel with the rotation axis $O_2$ of the worm 51, and open on the upper face 63$a$ of the attaching portion 63 and a lower face 63$b$ of the attaching portion 63 on the opposite side from the upper face 63$a$. The lower face 63$b$ is part of an outer face of the housing 6. Note that in the present embodiment, while each of the bolt insertion holes 630 is formed so as to appear circular when viewing the attaching portion 63 parallel to the rotation axis $O_2$, the bolt insertion holes 630 may be formed as arcuate grooves or radially-extending grooves, centered on the rotation axis $O_2$.

In the present embodiment, the motor case 44 is fastened to housing 6 by three bolts 7. Three fastening portions 445, respectively corresponding to the three bolts 7, are provided on the bottom portion 443 of the motor case 44 along a peripheral direction of the inner-side annular protruding portion 444. Each fastening portion 445 receives the bolt 7 by the external thread 711 of the bolt 7 being screwed into the screw hole 440. Tightening the bolts 7 generates axial force in the bolts 7, and thus the motor case 44 is fastened to the housing 6.

The three bolt insertion holes 630 respectively corresponding to the three bolts 7 are formed in the attaching portion 63 of the housing 6, along the peripheral direction of the outer-side annular protruding portion 64. The threaded portion 71 of each bolt 7 is inserted into the bolt insertion hole 630 from the lower face 63$b$ side toward the upper face 63$a$ side of the attaching portion 63, and is screwed into the screw hole 440 of the motor case 44. The head 72 of the bolt 7 comes into contact with the lower face 63$b$ of the attaching portion 63. Note that a washer may be interposed between the head 72 and the lower face 63$b$.

Positioning of the motor case 44 and the housing 6 is performed by fitting the inner-side annular protruding portion 444 of the motor case 44 into an inner side of the outer-side annular protruding portion 64 of the housing 6. The outside diameter of the inner-side annular protruding portion 444 is formed to be slightly smaller than the diameter of an inner peripheral face 64$b$ of the outer-side annular protruding portion 64 that faces the outer peripheral face 444$b$ of the inner-side annular protruding portion 444 (bore diameter of outer-side annular protruding portion 64). When attaching the motor 4 to the housing 6, after fitting the inner-side annular protruding portion 444 to the outer-side annular protruding portion 64 and aligning the rotation axis $O_1$ of the output rotation shaft 43 with the rotation axis $O_2$ of the worm 51, relatively rotating the housing 6 and the motor 4 about the rotation axes $O_1$ and $O_2$ as a center enables the bolt insertion holes 630 of the housing 6 and a plurality of the screw holes 440 of the motor case 44 to be easily made to communicate.

Next, expansion/contraction vibrations generated in the motor 4 due to rotation of the rotor 42, and effects of the above-described attaching structure for suppressing conveyance of the expansion/contraction vibrations to the housing 6, will be described with reference to FIG. 9A, FIG. 9B, FIG. 10A, and FIG. 10B.

Figures 9A, 9B:
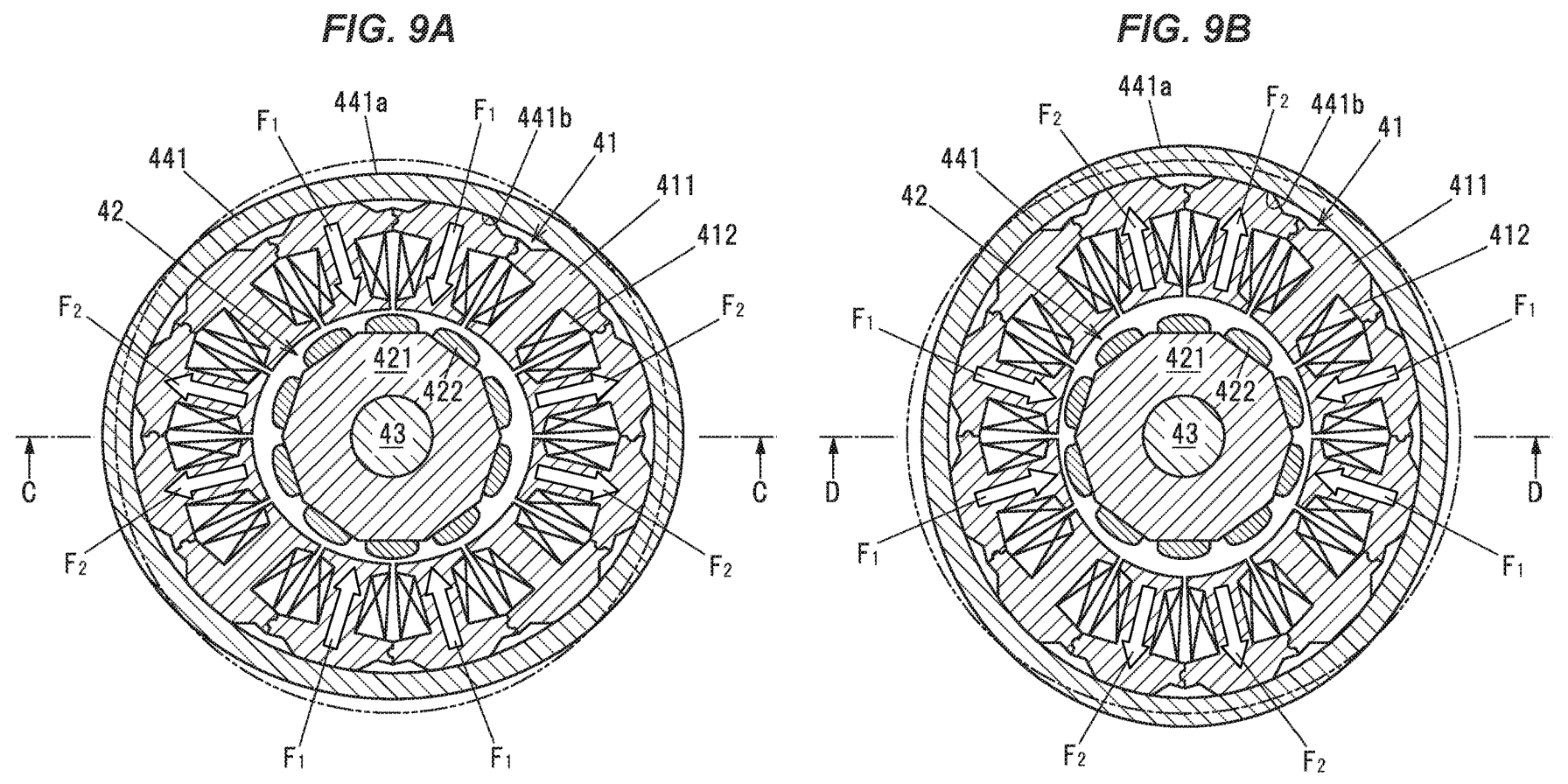
Figure 10B:
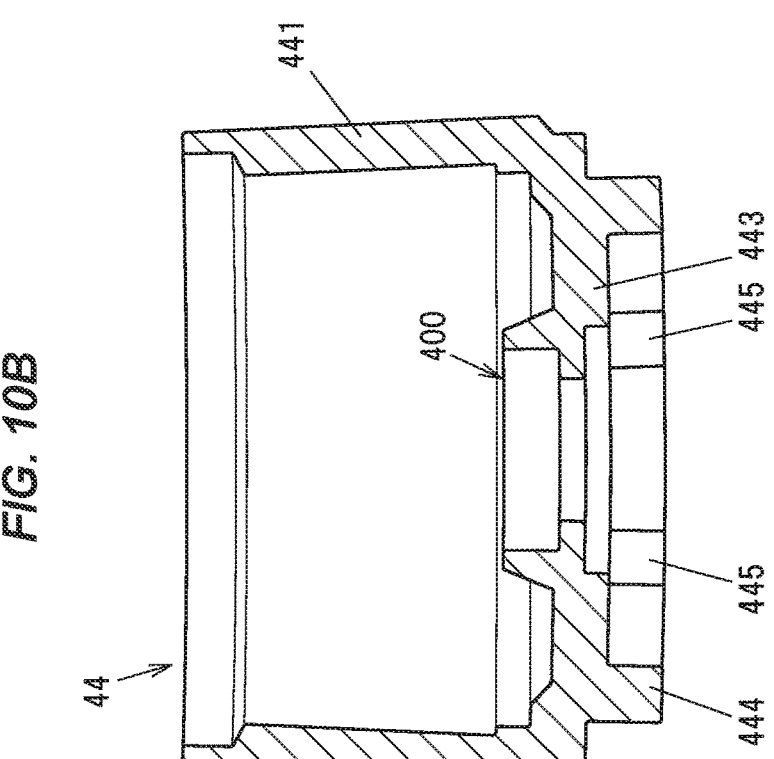
FIG. 10B is a sectional view of the motor case taken along line D-D in FIG. 9B.
Figure 10A:
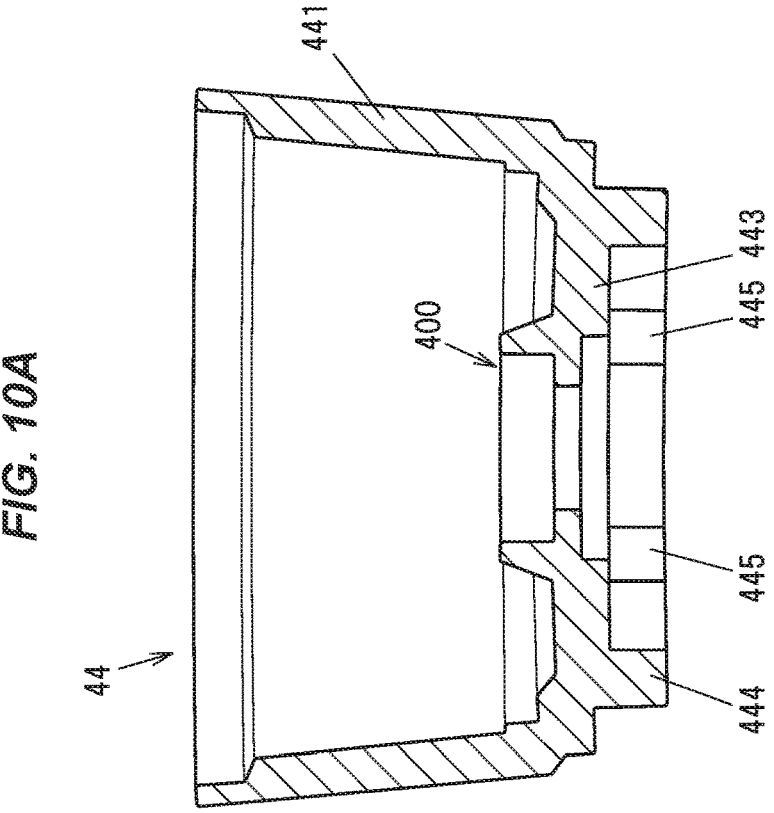
FIG. 10A is a sectional view of the motor case taken along line C-C in FIG. 9A.

FIG. 9A and FIG. 9B are explanatory diagrams illustrating expansion/contraction vibrations of the motor 4 in an exaggerated manner. FIG. 9A illustrates a state in which the stator 41 and the cylindrical portion 441 of the motor case 44 expand in diameter in a right-left direction in the drawing and contract in diameter in the up-down direction in the drawing, and FIG. 9B illustrates a state in which the stator 41 and the motor case 44 expand in diameter in the up-down direction in the drawing and contract in diameter in the right-left direction in the drawing. Also, in FIG. 9A and FIG. 9B, the attractive force that the teeth 411 of the stator 41 are subjected to from the magnets 422 is indicated by arrows $F_1$, and the repulsive force that the teeth 411 are subjected to from the magnets 422 is indicated by arrows $F_2$. The long dashed double-short dashed lines in FIG. 9A and FIG. 9B indicate the shape of an outer edge of the cylindrical portion 441 in a power-off state when no current is being supplied to the windings 412. FIG. 10A is a sectional view of the motor case 44 taken along line C-C in FIG. 9A. FIG. 10B is a sectional view of the motor case 44 taken along line D-D in FIG. 9B.

The stator 41 expands in diameter in the direction in which it is subjected to repulsive force from the magnets 422, and contracts in diameter in the direction in which it is subjected to attractive force. Hence, the shape of the outer peripheral face 441$a$ of the cylindrical portion 441 of the motor case 44 expands and contracts into an elliptical shape with respect to the shape indicated by the long dashed double-short dashed lines in FIG. 9A and FIG. 9B. A major axis direction and a minor axis direction of this elliptical shape rotate together with the rotor 42 about the rotation axis $O_1$ as a center thereof. As the cylindrical portion 441 expands and contracts, the bottom portion 443 of the motor case 44 also exhibits deflection, as illustrated in FIG. 10A and FIG. 10B. This deflection of the bottom portion 443 is small at the center portion side near the holding hole 400 and great on the outer edge side thereof.

When such expansion/contraction vibrations of the cylindrical portion 441 are conveyed from the motor case 44 to the housing 6, and further conveyed from the housing 6 to the column tube 26 and the bracket 8 via the sensor case 27, the sound generated by this vibration may be audibly perceived by the driver and passengers as abnormal noise, and cause an unpleasant sensation. Also, when amplitude of the expansion/contraction vibrations is great, there is concern that the vibrations will be conveyed from the column tube 26 to the upper shaft 211 and the steering wheel 10 via the bearing 28.

In the present embodiment, providing the fastening portions 445 further on the inner side in the radial direction than the outer peripheral face 441$a$ of the cylindrical portion 441 on the outer peripheral side of the stator 41 suppresses deflection vibrations of the bottom portion 443 caused by the expansion/contraction vibrations of the cylindrical portion 441 from being conveyed to the housing 6. Also, in the present embodiment, the rigidity of the portion of the bottom portion 443 that is on the inner side of the outer peripheral face 444$b$ of the inner-side annular protruding portion 444 is increased due to reinforcing effects of the inner-side annular protruding portion 444 of the bottom portion 443, and providing the fastening portions 445 in this portion in which the rigidity is increased further suppresses the expansion/contraction vibrations of the cylindrical portion 441 from being conveyed to the housing 6.

Further, due to the structure in which the distal end face 444$c$ of the inner-side annular protruding portion 444 of the motor case 44 comes into contact with the upper face 63$a$ of the attaching portion 63 of the housing 6, while the distal end face 64$a$ of the outer-side annular protruding portion 64 of the housing 6 does not come into contact with the motor case 44, the deflection of the bottom portion 443 of the motor case 44, which increases toward the outer edge side, is suppressed from being conveyed to the housing 6.

Figure 11:
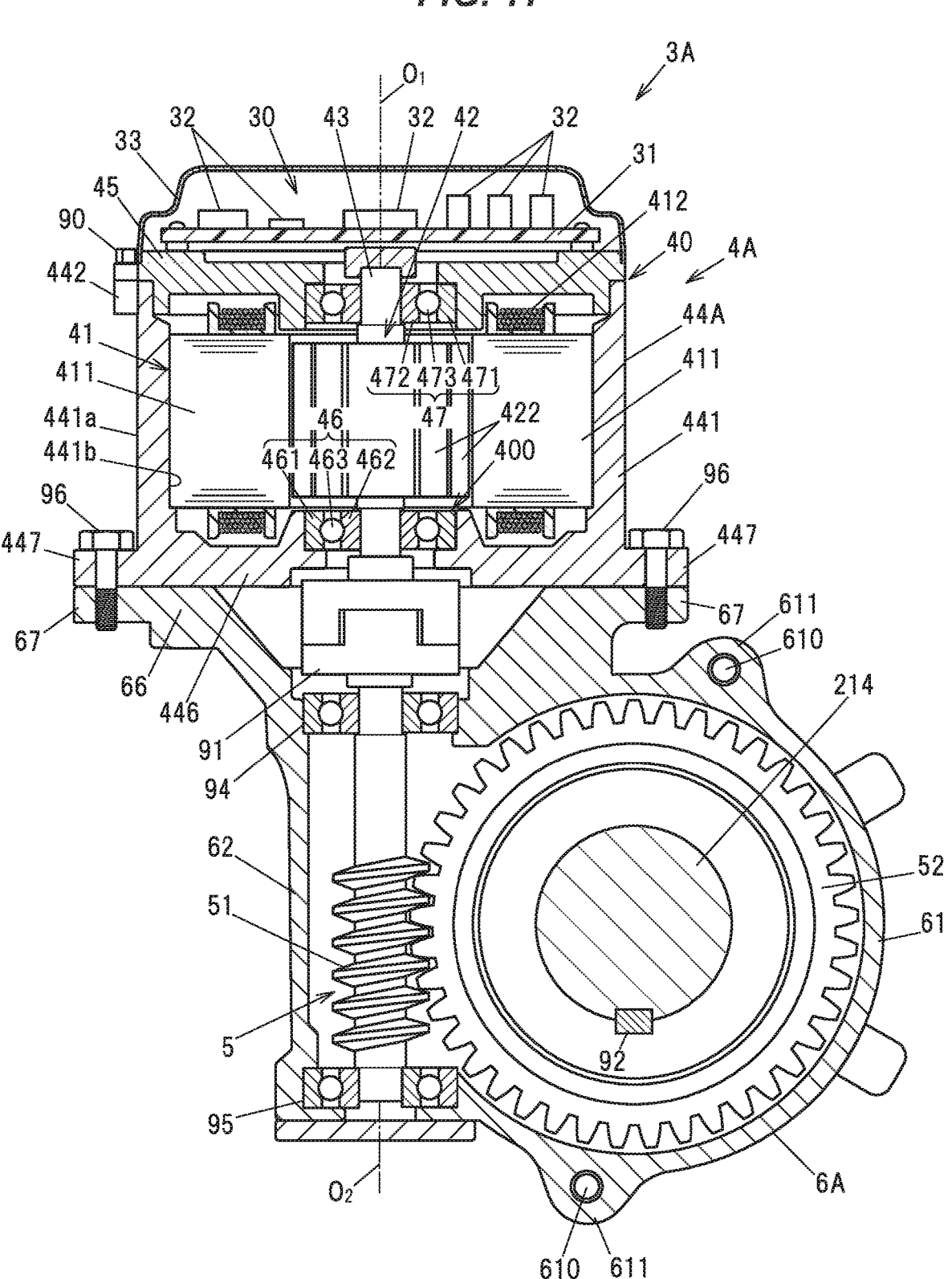
FIG. 11 is a sectional view illustrating a motor unit of a steering device as a prior art example.

FIG. 11 is a sectional view illustrating a motor unit 3A of a steering device as a comparative example. This motor unit 3A has the same structure as the motor unit 3 according to the embodiment described above, except that the attaching structure for attaching a motor 4A to a housing 6A is different. In FIG. 11, components common to those described in the above embodiment are denoted by the same reference signs as in FIG. 3.

A motor case 44A of the motor 4A has a bottom portion 446 in a flat plate form that is provided protruding toward the inner side in the radial direction from the end portion of the cylindrical portion 441, and a pair of flange portions 447 provided on an outer peripheral side of the bottom portion 446. The housing 6A has an attaching portion 66 in a flat plate form that faces the bottom portion 446, and a pair of flange portions 67 provided on an outer periphery of the attaching portion 66. The flange portions 447 of the motor case 44A are fastened to the respective flange portions 67 of the housing 6A by bolts 96.

Figure 12:
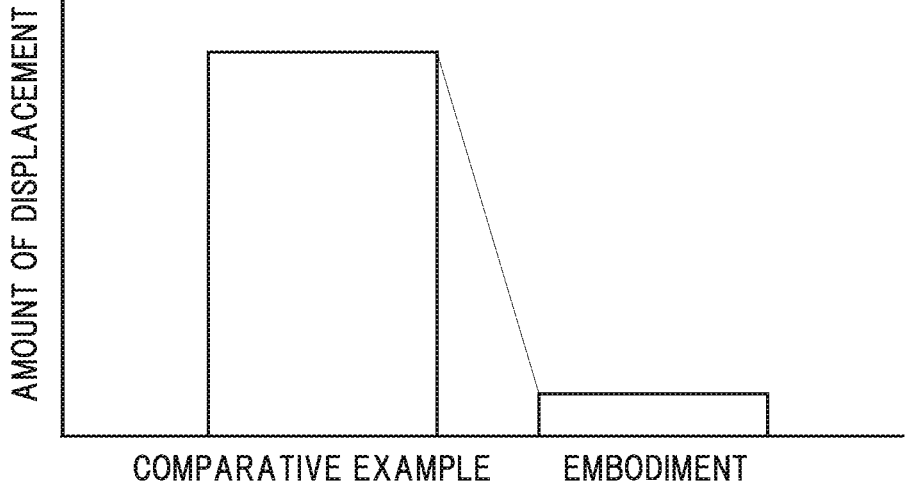
FIG. 12 is a graph showing an amount of displacement generated in the bracket when a predetermined driving current is supplied to the motor in the steering device using the motor units as the embodiment and a comparative example.

FIG. 12 is a graph that shows magnitude of displacement generated at a middle portion 840 (see FIG. 2) of the plate 84 of the bracket 8 when the capsule 85 is fixed to a fixing member and a predetermined driving current is supplied to the motor 4 in the steering device 1 using the motor unit 3 according to the above embodiment, and the magnitude of displacement generated at the middle portion 840 of the plate 84 of the bracket 8 when the motor unit 3 is replaced with the motor unit 3A according to the comparative example. Note that the magnitude of the displacement shown in FIG. 12 indicates the maximum value of amount of displacement from a reference position during a period of time over which the rotor 42 makes one rotation relative to the stator 41, in which the position of the middle portion 840 of the plate 84 in a power-off state when the stator 41 is not supplied with driving current is the reference position.

When the expansion/contraction vibrations generated by the motors 4 and 4A are conveyed from the housing 6 to the bracket 8 via the sensor case 27 and column tube 26, elastic deformation occurs in each component of the bracket 8, and the position of the middle portion 840 of the plate 84 is displaced from the reference position. As shown in FIG. 12, when the motor unit 3 according to the above embodiment is used, the amount of displacement generated in the plate 84 of the bracket 8 is suppressed to about one-tenth as compared to when the motor unit 3A according to the comparative example is used. This indicates that in the present embodiment, the vibrations conveyed from the motor 4 to the housing 6 are greatly suppressed.

(Effects of Embodiment)

As described above, according to the motor unit 3 of the above embodiment and the steering device 1 using the same, the expansion/contraction vibrations generated by the motor 4 can be suppressed from being conveyed to the housing 6. Accordingly, the sound generated by the expansion/contraction vibrations of the motor 4 can be kept from being audibly perceived by the driver and the passengers as abnormal noise and causing an unpleasant sensation. Also, attaching the motor case 44 to the housing 6 by a plurality of the bolts 7 ensures supporting rigidity of the motor 4 with respect to the housing 6.

According to the embodiment described above, the motor case 44 is attached to the housing 6 by the three bolts 7, the effects of suppressing vibration conveyed from the motor 4 to the housing 6 is enhanced as compared to a case in which the motor case 44 is attached to the housing 6 by two bolts 7 symmetrically disposed at positions across the rotation axis $O_1$ of the output rotation shaft 43 as the center thereof, for example. That is to say, when the motor case 44 is attached to the housing 6 with the two bolts 7 disposed at symmetrical positions across the rotation axis $O_1$, at the timing when the major diameter direction of the cylindrical portion 441 that has become the elliptical shape due to the attractive force and the repulsive force of the magnets 422 of the rotor 42 coincides with the direction of array of the two bolts 7, the deflection of the bottom portion 443 of the motor case 44 becomes great at both of the two fastening portions 445, and displacement due to the vibrations is readily conveyed from the motor 4 to the housing 6. On the other hand, according to the present embodiment, the three fastening portions 445 are provided along the peripheral direction of the inner-side annular protruding portion 444, so that the phase of the deflection of the bottom portion 443 of the motor case 44 and the phase of the fastening portions 445 are offset, and conveyance of vibrations from the motor 4 to the housing 6 can be suppressed.

Figure 13:
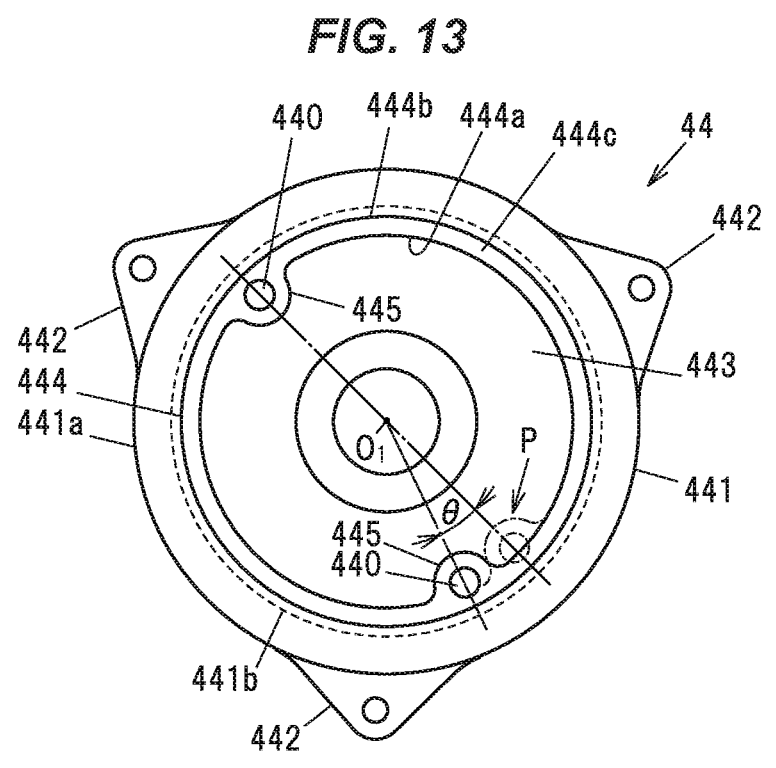

Further, even in the form in which the two fastening portions 445 are fixed by two bolts 7, offsetting the two fastening portions 445 by a predetermined angle from the symmetrical positions across the rotational axis $O_1$ enables vibrations to be suppressed from being conveyed from the motor 4 to the housing 6. For example, one of the three fastening portions 445 illustrated in FIG. 7 may be omitted, and the motor case 44 may be configured as illustrated in FIG. 13. The two fastening portions 445 illustrated in FIG. 13 are disposed such that one fastening portion 445 is provided at a position offset in the peripheral direction of the inner-side annular protruding portion 444 by a predetermined angle $\theta$ from a position P at which the one fastening portion 445 is symmetrical with respect to the other fastening portion 445 across the rotation axis $O_1$. In this case as well, conveyance of vibrations from the motor 4 to the housing 6 can be suppressed compared to a case in which the two fastening portions 445 are provided at symmetrical positions across the rotational axis $O_1$.

Note that four or more fastening portions 445 may be provided along the peripheral direction of the inner-side annular protruding portion 444. That is to say, the number of fastening portions 445 is preferably two or more, and even more preferably three or more. Also, when a vibration mode of the stator 41 and a side face of the motor case 44 due to the expansion/contraction vibrations generated in the motor 4 is not an elliptical shape but an N-sided polygonal shape of a triangle or higher (where N is a natural number of 3 or more), conveyance of vibrations from the motor 4 to the housing 6 can be suppressed by disposing fastening portions 445 at positions somewhat offset from an angular pitch obtained by dividing 360 degrees by N along the peripheral direction.

(Appendices)

Although the present invention has been described above based on the embodiment, this embodiment does not limit the invention according to the claims. Also, it should be noted that not all combinations of features described in the embodiment are essential as means for solving the problems of the invention. Also, the present invention can be implemented with appropriate modifications by omitting some configurations, or adding or substituting configurations, without departing from the spirit thereof. Furthermore, the following modifications can be made, for example.

In the above embodiment, a case has been described in which the present invention is applied to the steering device 1 of a column-assisting type that applies steering assisting force to the column shaft 21, but the configuration of the steering device is not limited to the column-assisting type, and the present invention can be applied to various types of steering devices that are known, such as, for example, a dual pinion type in which two pinion gear shafts are meshed with a rack shaft, of which one pinion gear shaft is linked to the steering wheel via a universal joint or the like, and also the other pinion gear shaft is imparted with a steering assisting force, a rack parallel type in which a motor is placed parallel to a rack shaft and torque of the motor is applied to the rack shaft as a steering assisting force in the axial direction via a belt and ball screw mechanism, and so forth.

Also, in the above embodiment, a case has been described in which the bolts 7 that have the threaded portions 71 and the heads 72 are used as the fastening members, but this is not restrictive, and for example, stud bolts that have external threads on both end portions thereof may be screwed into the motor case 44, and used as fastening members in combination with nuts. Also, rivets may be used as the fastening members.

Also, the present invention can also be applied to a steering device for an automatic driving vehicle that is capable of automated driving without a human being involved in operation. Furthermore, the present invention is not limited to being applied to steering devices, and can also be applied to various mechanical devices such as industrial machines equipped with motors, and in particular can be suitably applied to mechanical devices that require a high level of vibration reduction, such as semiconductor manufacturing equipment and so forth.

REFERENCE SIGNS LIST

1 STEERING DEVICE
11 FRONT WHEEL (STEERED WHEEL)
12 RACK SHAFT (STEERED SHAFT)
3 MOTOR UNIT
4 MOTOR
41 STATOR

42 ROTOR
43 OUTPUT ROTATION SHAFT
44 MOTOR CASE
440 SCREW HOLE
441 CYLINDRICAL PORTION
443 BOTTOM PORTION
444 INNER-SIDE ANNULAR PROTRUDING POR-
TION
444B OUTER PERIPHERAL FACE
445 FASTENING PORTION
5 WORM REDUCER MECHANISM
51 WORM
52 WORM WHEEL
6 HOUSING
61 MAIN BODY PORTION
62 TUBULAR PORTION
63 ATTACHING PORTION
630 BOLT INSERTION HOLE
64 OUTER-SIDE ANNULAR PROTRUDING POR-
TION
7 BOLT (FASTENING MEMBER)

The invention claimed is:

1. A motor unit, comprising:
a motor that has a stator, a rotor disposed on an inner side of the stator, an output rotation shaft that rotates integrally with the rotor, and a motor case that houses the stator;
a worm reducer mechanism that has a worm linked to the output rotation shaft, and a worm wheel that meshes with the worm;
a housing that houses the worm and the worm wheel; and
a fastening member that fastens the motor case and the housing, wherein
the motor case has a cylindrical portion that houses the stator, and a bottom portion that is provided so as to protrude toward an inner side in a radial direction from one end portion of the cylindrical portion,
a fastening portion for receiving the fastening member is provided at the bottom portion,
an inner-side annular protruding portion that is provided on the bottom portion of the motor case fits on an inner side of an outer-side annular protruding portion provided on the housing,
the fastening portion is provided on an inner side of an outer peripheral face of the inner-side annular protruding portion, and
a height of the outer-side annular protruding portion is set to be smaller than a length of the inner-side annular protruding portion in an axial direction, and a distal end face of the outer-side annular protruding portion is not in contact with the motor case.

2. The motor unit according to claim 1, wherein
the housing has an attaching portion in which an insertion hole, through which the fastening member is inserted, is formed, and
the attaching portion faces the bottom portion of the motor case.

3. The motor unit according to claim 2, wherein
the fastening member is a bolt,
a screw hole into which the bolt is screwed is formed in the fastening portion, and
the bolt is inserted through the insertion hole of the attaching portion and screwed into the screw hole.

4. The motor unit according to claim 2, wherein the housing has a main body portion that houses the worm wheel, and a tubular portion that houses the worm, and the attaching portion is formed extending from one end portion of the tubular portion in a perpendicular direction to a rotation axis of the worm.

5. The motor unit according to claim 1, wherein two or more of the fastening portions are provided along a periph- eral direction of the inner-side annular protruding portion.

6. The motor unit according to claim 5, wherein two of the fastening portions are provided on the bottom portion, and the two fastening portions are provided at positions offset by a predetermined angle from symmetrical positions across a rotational axis of the motor.

7. The motor unit according to claim 6, wherein, in a case in which a vibration mode of the stator and the cylindrical portion of the motor case due to expansion/contraction vibrations generated in the motor is not an elliptical shape but an N-sided polygonal shape of a triangle or higher (where N is a natural number of 3 or more), the two or more of the fastening portions are disposed at positions each offset by a predetermined angle from an angular pitch obtained by dividing 360 degrees by N along the peripheral direction.

8. A vehicle steering device that steers steered wheels of a vehicle by moving, in an axial direction, a steered shaft that extends in a vehicle width direction of the vehicle, wherein the motor unit according to claim 1 is used as a drive source to generate a moving force that moves the steered shaft in the axial direction.

* * * * *